US012787975B2

(12) United States Patent
Clavin et al.

(10) Patent No.: US 12,787,975 B2
(45) Date of Patent: Nov. 10, 2026

(54) DEVICES, SYSTEMS, AND METHODS TO ACTIVELY OR PASSIVELY SCAN RFID MICROCHIPS IN COMPANION ANIMALS AND OPTIMIZE THE WORKFLOW TO REUNITE ANIMALS WITH OWNERS

(71) Applicants: James Richard Clavin, Baltimore, MD (US); Carrie Elisabeth Johnson, Baltimore, MD (US)

(72) Inventors: James Richard Clavin, Baltimore, MD (US); Carrie Elisabeth Johnson, Baltimore, MD (US)

( * ) Notice: Subject to any disclaimer, the term of this patent is extended or adjusted under 35 U.S.C. 154(b) by 0 days.

(21) Appl. No.: 18/793,841

(22) Filed: Aug. 4, 2024

(65) Prior Publication Data

US 2026/0033456 A1 Feb. 5, 2026

(51) Int. Cl.
*A01K 11/00* (2006.01)
*G06K 7/10* (2006.01)

(52) U.S. Cl.
CPC ........ *A01K 11/006* (2013.01); *G06K 7/10217* (2013.01); *G06K 2007/10534* (2013.01)

(58) Field of Classification Search
CPC ............. A01K 11/006; G06K 7/10217; G06K 2007/10534
See application file for complete search history.

(56) References Cited

U.S. PATENT DOCUMENTS

| | | | | |
|---|---|---|---|---|
| 2006/0143302 A1* | 6/2006 | Welsh | A01K 11/00 709/229 |
| 2017/0202185 A1* | 7/2017 | Trumbull | A61B 5/02055 |
| 2018/0027772 A1* | 2/2018 | Gordon | A01K 1/0029 |
| 2020/0160009 A1* | 5/2020 | Vatn | G06K 7/10128 |
| 2020/0245590 A1* | 8/2020 | Hill | A01K 29/005 |
| 2021/0012293 A1* | 1/2021 | Conlan | G06K 7/10366 |
| 2024/0057554 A1* | 2/2024 | Williams | A01K 29/005 |

FOREIGN PATENT DOCUMENTS

| | | | |
|---|---|---|---|
| CA | 3011625 A1 * | 7/2017 | A01K 29/005 |

* cited by examiner

*Primary Examiner* — Tuyen K Vo
(74) *Attorney, Agent, or Firm* — Olive Law Group, PLLC

(57) ABSTRACT

Devices, methods, and systems to actively or passively scan an RFID microchip in a companion animal, transmit the associated data to software, allow users to augment the data with additional information to create a post, and allow users to interact in the software in the context of reuniting the lost animal with its owner.

7 Claims, 6 Drawing Sheets

DEVICES, SYSTEMS, AND METHODS TO ACTIVELY OR PASSIVELY SCAN RFID MICROCHIPS IN COMPANION ANIMALS AND OPTIMIZE THE WORKFLOW TO REUNITE ANIMALS WITH OWNERS

CROSS-REFERENCE TO RELATED APPLICATIONS

This application claims the benefit of priority to U.S. Provisional Application No. 63/578,991 filed on Aug. 26, 2023, which is incorporated herein by reference in its entirety.

BACKGROUND OF THE INVENTION

The present invention relates to systems and devices for identifying and tracking companion animals using radio-frequency identification (RFID) technology, and more particularly to a multi-mode RFID microchip scanner system for reuniting lost pets with their owners.

Many pets have an ISO-standard microchip implanted under their skin by veterinarians or animal shelters for identification purposes. Each microchip stores a unique ID that can be read by a compatible RFID scanner. Conventionally, when a lost pet is found, the typical process is to physically capture or contain the animal and bring it to a facility with a microchip scanner, such as a veterinary clinic or animal shelter. A staff member scans the pet to retrieve the microchip ID and then searches that ID in a pet registry database to find the owner's contact information. This process is effective if the animal can be handled and if a scanner is readily available, but it has limitations. In many cases, a person who finds a stray animal may not have immediate access to a microchip scanner, or the animal may be skittish and cannot be easily caught. When an immediate microchip scan isn't possible, people often resort to informal methods—for example, posting a description or photo of the found animal on community social media and hoping the owner (or someone who knows the owner) sees it. This reliance on social networks is a separate workflow that doesn't leverage the microchip at all, and it can be hit-or-miss in reuniting pets with owners.

Given these challenges, there is a recognized need for improvement in pet recovery technology. Ideally, a solution would bridge the gap between microchip identification and community sharing of lost-pet information. Specifically, there is a need for an RFID microchip scanner that is easily accessible to the general public (not just animal professionals) and that can operate in multiple modes—for instance, usable both as a handheld device by a person and as a fixed station that can passively scan animals without human intervention. Additionally, there is a need for a software platform connected to such scanners that can automate the retrieval of owner information once a microchip is scanned and seamlessly facilitate communication between the person who found the pet and the owner. By addressing these needs—making scanning devices more available and integrating them with modern communication tools—the likelihood of reuniting a lost companion animal with its owner can be significantly increased.

SUMMARY OF THE INVENTION

The present invention provides an integrated system for reuniting lost companion animals with their owners by combining a versatile RFID microchip scanner with a networked software application and database. In one aspect, the invention includes a portable microchip scanning device that can be used in two modes: (1) Active (handheld) mode, in which a user attaches or connects the scanner to a mobile device (such as a smartphone) to scan a found animal's microchip on the spot; and (2) Passive mode, in which the scanner is mounted on a freestanding unit (or station) placed in an area frequented by animals so it can automatically scan any microchipped animal that comes within range, without requiring the animal to be restrained. The scanner device contains an antenna capable of reading ISO 11784/11785-compliant RFID microchips and may include on-board memory to record the microchip's unique ID and the scanner's location at the time of the scan. The device can communicate the scan data to a cloud-connected system via either a wired connection through the user's mobile device or a wireless link (Bluetooth/Wi-Fi), thereby transmitting the animal's ID and the geolocation of the scan.

Once the microchip ID data is obtained, the invention's software application (which may run on the user's smartphone and/or a remote server) automatically checks the appropriate pet microchip registry for that ID and retrieves associated owner contact information or recovery instructions. The software application then allows the user who scanned the animal to create a "found pet" post populated with relevant details—for example, the animal's description or photo, the location and time of the scan, and any contact info or reward offered by the finder. This post is shared on a network accessible by other users of the system. Likewise, a pet owner who has lost an animal can create a "lost pet" post in the system. The backend database stores these posts and all scan events securely, and it enables cross-referencing of data—for instance, the system can match a new scan event with an existing lost pet report if they share the same microchip ID. Users can search the database or application for posts by microchip number or by location (e.g., to see if a pet was scanned in a particular area) to aid in the reunion process.

A notable feature of the platform is that it facilitates communication between the pet finder and the pet owner in a privacy-protected manner. Instead of immediately revealing personal phone numbers or email addresses, the application provides an in-app messaging system or relay that allows the two parties to discuss details about retrieving the pet. Only if both parties agree to share their contact information will the system reveal it. This ensures security and privacy during the interaction. Additionally, the system can update the status of a post when a pet is reunited with its owner, and it supports various optional enhancements such as integration of facial recognition to compare pet photos, and mechanisms for offering rewards for assistance.

In summary, the invention streamlines the workflow of locating a lost pet by making RFID microchip scanning more accessible and by automatically integrating scan results with a collaborative lost-and-found network. By doing so, it overcomes the limitations of traditional pet recovery methods and greatly increases the chances of swiftly reuniting lost animals with their rightful owners.

BRIEF DESCRIPTION OF DRAWINGS

For a more complete understanding of the invention, reference is made to the following description and accompanying drawings, in which.

DETAILED DESCRIPTION OF THE INVENTION

The present invention will now be described in detail with reference to the accompanying drawings, which illustrate exemplary embodiments of the system. It is to be understood that the embodiments and specific terminology are for illustrative purposes only, and should not be construed as limiting the scope of the invention as defined by the claims.

Figure 1:
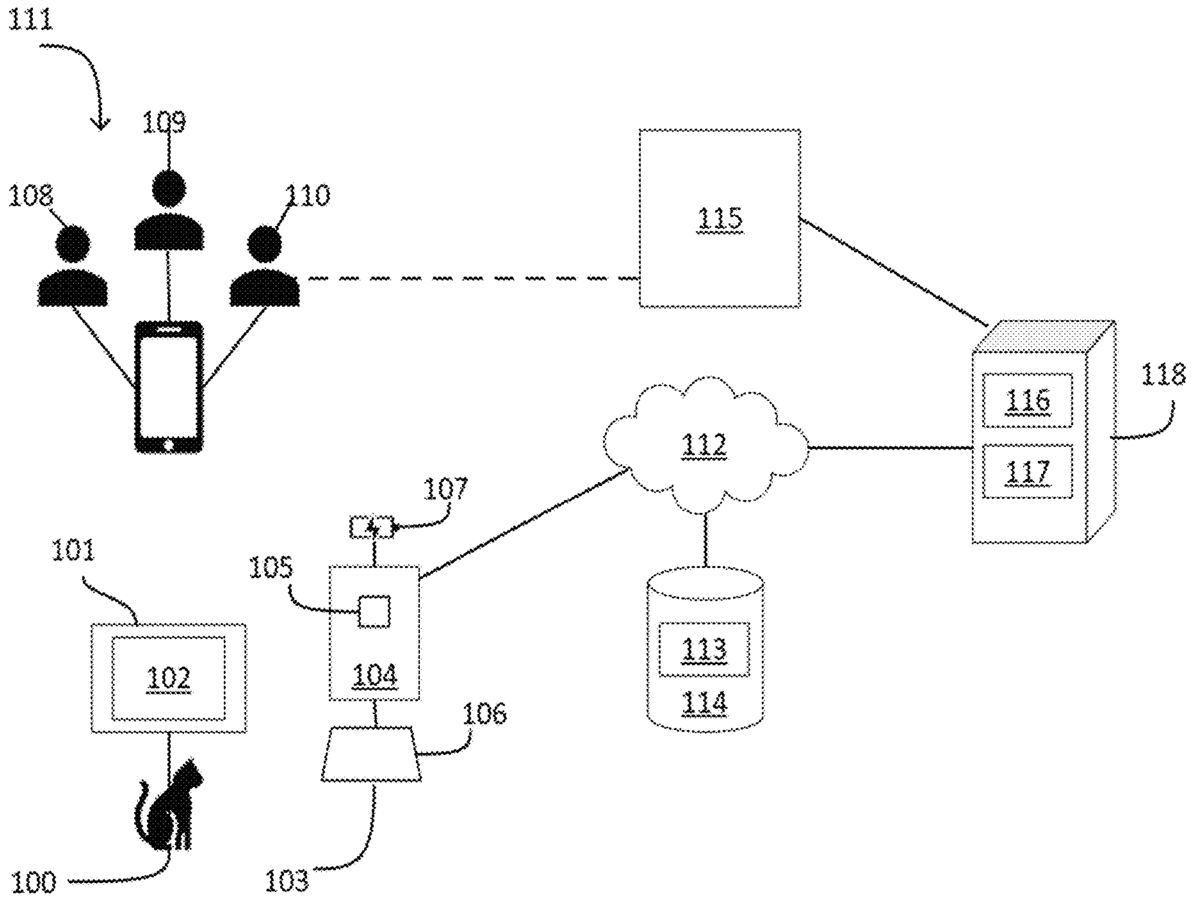
FIG. 1 is a system diagram illustrating a platform for geolocating and finding companion animals, according to an embodiment of the invention.

Referring to FIG. 1, the system is designed to facilitate the identification of a lost companion animal and the reunification with its owner through integrated hardware and software components. A companion animal 100 (for example, a dog or cat) is implanted with a standard RFID microchip 101 that stores a unique identification code (referred to as microchip unique identifier 102). To read this microchip, the system includes a portable scanning device 103 equipped with an RFID antenna 106 and reader circuitry. The scanning device 103 contains a microcontroller 104 that has a microprocess 105 to process RFID signals and manage data communication.

In one mode of operation (active, handheld use), the scanning device 103 is connected to a user's mobile computing device, such as a smartphone. This connection can be physical—for instance, via a magnetic connector 305 that attaches the scanner to the smartphone. Through this connector, the scanner can draw power from the phone (shown as power line 302 in the schematic) and establish data communication between the scanner's electronics 304 and the phone's software. In alternative implementations, the scanner 103 may connect to the phone wirelessly (e.g., via Bluetooth or Wi-Fi), enabling the phone to control the scanner and receive scan data without a direct cable.

In another mode of operation (passive, autonomous use), the scanning device 103 can be placed in a freestanding housing or stationary unit (e.g., a "Totem" device) to function continuously without being handheld. In this passive mode, the freestanding unit holds the scanner and may be installed in a fixed location such as a neighborhood entrance, a park, or near a home. The scanner 103 periodically emits reading fields and automatically scans any animal that comes within range, without human intervention. To support prolonged autonomous operation, the freestanding unit provides power 107 to the scanner. In one embodiment, the unit can use battery power (for example, a 5V rechargeable lithium-polymer battery for the microcontroller and a 9V battery for the RFID reader and antenna). In another embodiment, the unit is powered via a wired connection-such as a 5V DC supply from a USB power adapter plugged into a wall outlet, or a solar-powered setup feeding a regulator-ensuring the scanner remains continuously active. Once the power supply is attached and activated, the user can place the scanning device 103 and its mounting unit at the desired location, where it will operate independently in scanning animals that pass by.

Data collected by the scanning device 103 (in either mode) is relayed to a software application for processing. In the active/handheld scenario, the user's mobile application 111 (running on their smartphone) communicates with the scanner 103, receives the microchip ID 102 that was read, and typically also obtains the scan's timestamp and geolocation (using the phone's GPS). In the passive scenario, the freestanding unit could have its own communication module or also use a nearby device to send data; in both cases, the information eventually reaches the central system. The software application 111 is connected to a network 112 (such as the Internet) and communicates with a backend server 118. The backend server hosts a cloud-based service with a database 114 (also referred to as a central repository) that stores information 113 about pets, microchip IDs, user-generated posts, and user accounts. The server exposes an API 116 to the mobile application, allowing the app to send new scan data and retrieve matching information. The system also utilizes cloud services 117 associated with the server—for example, to store photos of found animals efficiently and to send notification emails or messages according to business logic (such as alerts for matching lost/found pets).

FIG. 1 also illustrates various user roles in the system. For instance, a user who finds a stray animal and scans its microchip using scanner 103 can be considered a scanning user 108 (the creator of a scan event/post 115). Another user may be a pet owner who has lost their animal—this pet owner user 110 would create a lost-pet report/post 115 in the system (a "lost post"). There can also be users who find an animal but are unable to scan it (they can create a manual "found post" 115), and users who simply browse or monitor the network to help reunite animals with owners (such a volunteer helper is denoted as 109 in the figure). All of these users interact with the system through the software application 111 on their devices, which presents a unified interface for creating and viewing posts and receiving notifications.

Figure 2:
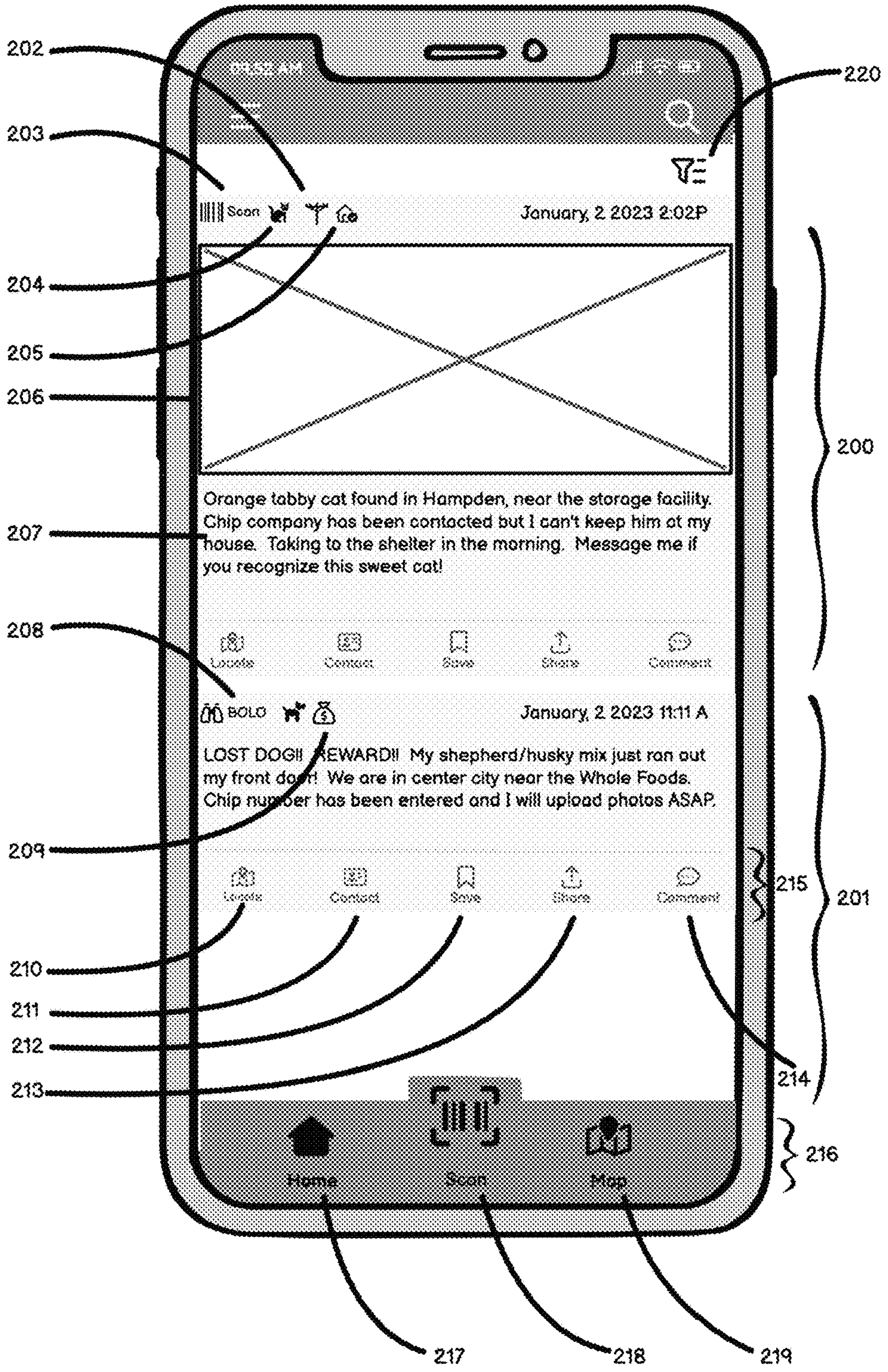
FIG. 2 is a user interface of an application for viewing and sharing information about scanned companion animals.

Referring to FIG. 2, the system's mobile application 111 is shown displaying its default home screen (identified by reference 217), which provides a feed of lost-and-found pet posts. In this feed, two main types of posts are presented: "scan posts" (reference 200) and "lost posts" (reference 201). A scan post is created when a pet's microchip is scanned by the device, whereas a lost post is created by a pet owner or user to report a missing animal. The feed displays these posts in a list format, potentially intermixed (e.g., a scan post followed by a lost post), along with contextual information such as the animal type and community input.

Each post in the feed includes a photograph of the animal and descriptive text. Specifically, a post comprises a photo (reference 206) of the companion animal and accompanying information (reference 207) provided by the user who created the post The information 207 could include details like the pet's name, description, last seen location, or any notes entered by the user. Above the photo 206, an information bar indicates what kind of post is being viewed. For example, if the post is a scan post, the interface will label it as such—this may be done via a text label or indicator (denoted by 203, indicating "Scan Post") and/or a special icon 202 signifying a scanned microchip post. If the post is a lost post, the information bar will similarly indicate "Be On the Look Out (BOLO) for a Lost Post" (reference 208). The species or type of the animal is also shown as an icon 204 (for instance, a dog silhouette if the pet is a dog, or a cat icon for a cat) in the post header. Additionally, if a lost post later gets updated to show that the pet has been reunited with its owner, an icon 205 will be displayed to denote that the animal has been returned home. This way, users scrolling through the feed can immediately distinguish scan posts from lost pet reports, identify the type of animal, and see the status of each lost pet report.

Below the photo 206 in each post entry, the app provides an interactive action bar (reference 215) with multiple buttons that allow users to engage with the post. These post-specific action options include: a Locate button (210), which when tapped will show the location associated with the post (for example, opening a map to display where the scan took place or the area where the pet was lost); a Contact button (211) that enables the user to get in touch with the person who created the post (e.g., initiating a secure in-app message or an email, without immediately revealing personal contact info); a Save button (212) to bookmark or favorite the post for later reference; a Share button (213) to share the post's details with others (for instance, via social media or text message); and a Comment button (214) which allows users to comment on the post or discuss it within the app. The feed interface also provides a filter function (220) to help users manage which posts are visible. By tapping the filter button 220, a user can filter the feed by various attributes—for example, showing only scan posts vs. lost posts, or filtering by proximity or date. This filtering feature makes it easier to find specific types of information in a crowded feed.

Figure 3:
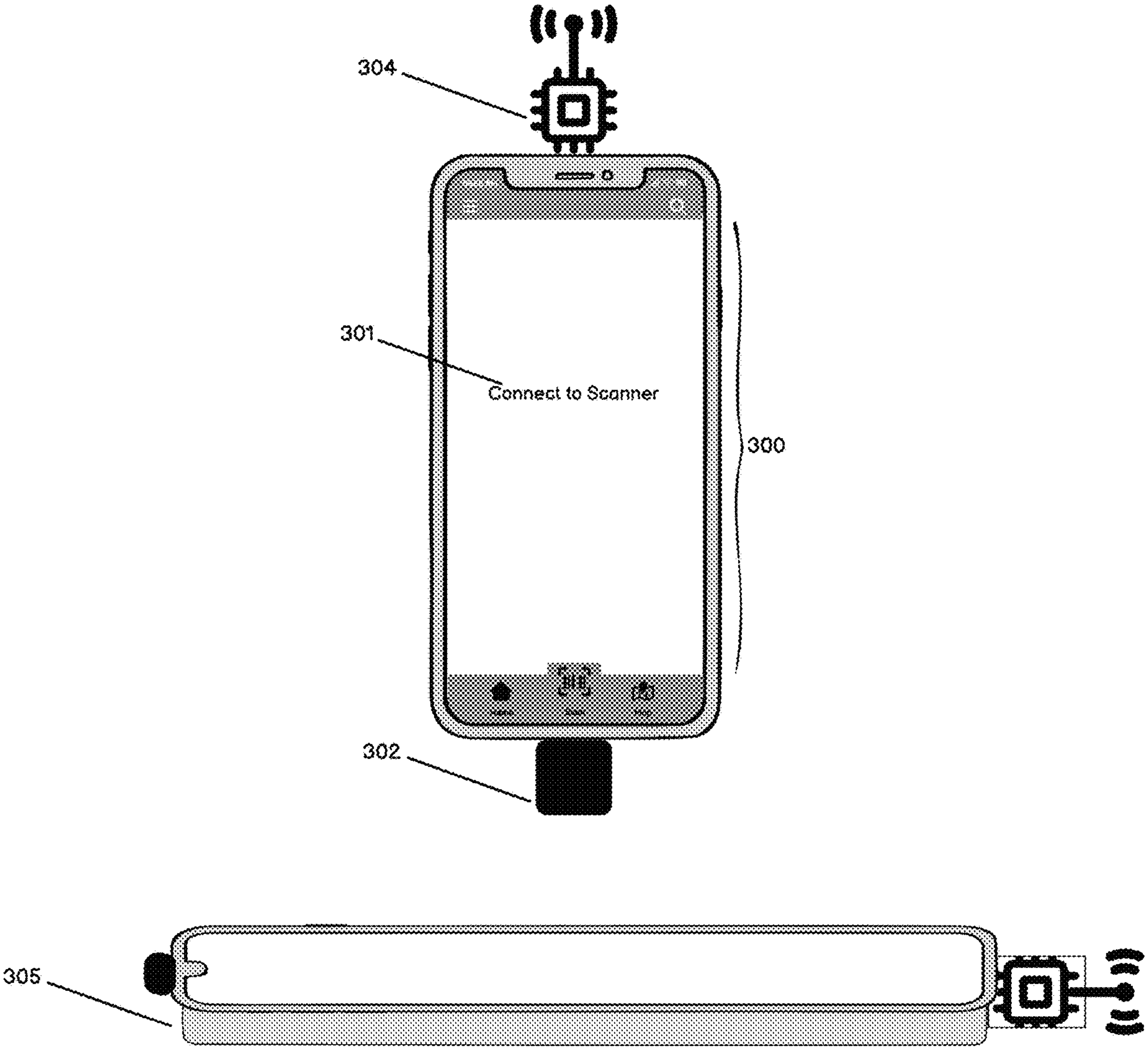
FIG. 3 is a user interface screen for connecting to a scanning device to read an animal's microchip.

The mobile app's global navigation is represented by a main navigation bar (reference 216), which is typically present at the bottom of the app interface. The main navigation bar 216 allows the user to switch between different primary sections or "tabs" of the application. For instance, from this nav bar the user can quickly initiate a new scan operation by tapping the Scan button (218). Selecting this Scan button 218 takes the user to the scan interface (as illustrated in FIG. 3) and powers on or connects to the scanning device to read a pet's microchip. Likewise, the navigation bar includes a Map button (219) that the user can tap to open the map view of the system. By tapping the Map button 219, the user is brought to a map screen (see FIG. 5) where all nearby posts are displayed geographically, and where the user can search for posts by microchip ID or view the locations of recent scans. In summary, FIG. 2's interface shows the home/feed screen 217 with its list of posts (200, 201) and associated indicators (202-205, 208) and controls (210-214, 220), while also highlighting the presence of the main navigation bar 216 (with buttons 218 and 219) for accessing other parts of the application. This cohesive interface is designed to let users view community-shared pet information and take actions (locate, contact, share, etc.) to help reunite lost pets with their owners directly from the feed screen.

Scanner Connection and Scan Process (FIG. 3 & FIG. 6): When the user is ready to scan a found animal, they use the scanning interface of the app. FIG. 3 shows a screenshot of the scan screen 300 in the mobile application. On this screen, the app guides the user to connect to the scanning device 103. For example, a Connect button 301 is provided-when the user taps this button, the app initiates a pairing process with the scanner's microcontroller 104. If the scanner 103 is to be used in handheld mode via a wired connection (as described earlier), the user would attach the scanner physically to the phone using the magnetic connector 305 before tapping the connect button. In the case of a wireless scanner connection, tapping the connect button might prompt the app to search for available scanner devices (e.g., via Bluetooth) and establish the link. Once the application confirms that the scanner 103 is connected and ready (for instance, the scanner might send an acknowledgment or its status to the app), the user can activate the scanner to read a nearby animal's microchip.

It should be noted that FIG. 3 also conceptually illustrates the phone-scanner attachment. In the depicted embodiment, the scanning device 103 is powered through the smartphone—the power source 302 (the phone's battery/port) supplies energy to the scanner's circuitry 304 via the connector 305. This allows the scanner to operate without its own bulky power supply when in handheld use. (In other embodiments, the scanner 103 could have its own battery and communicate wirelessly, eliminating the need for a physical attachment; both approaches are within the scope of the invention.)

Figure 6:
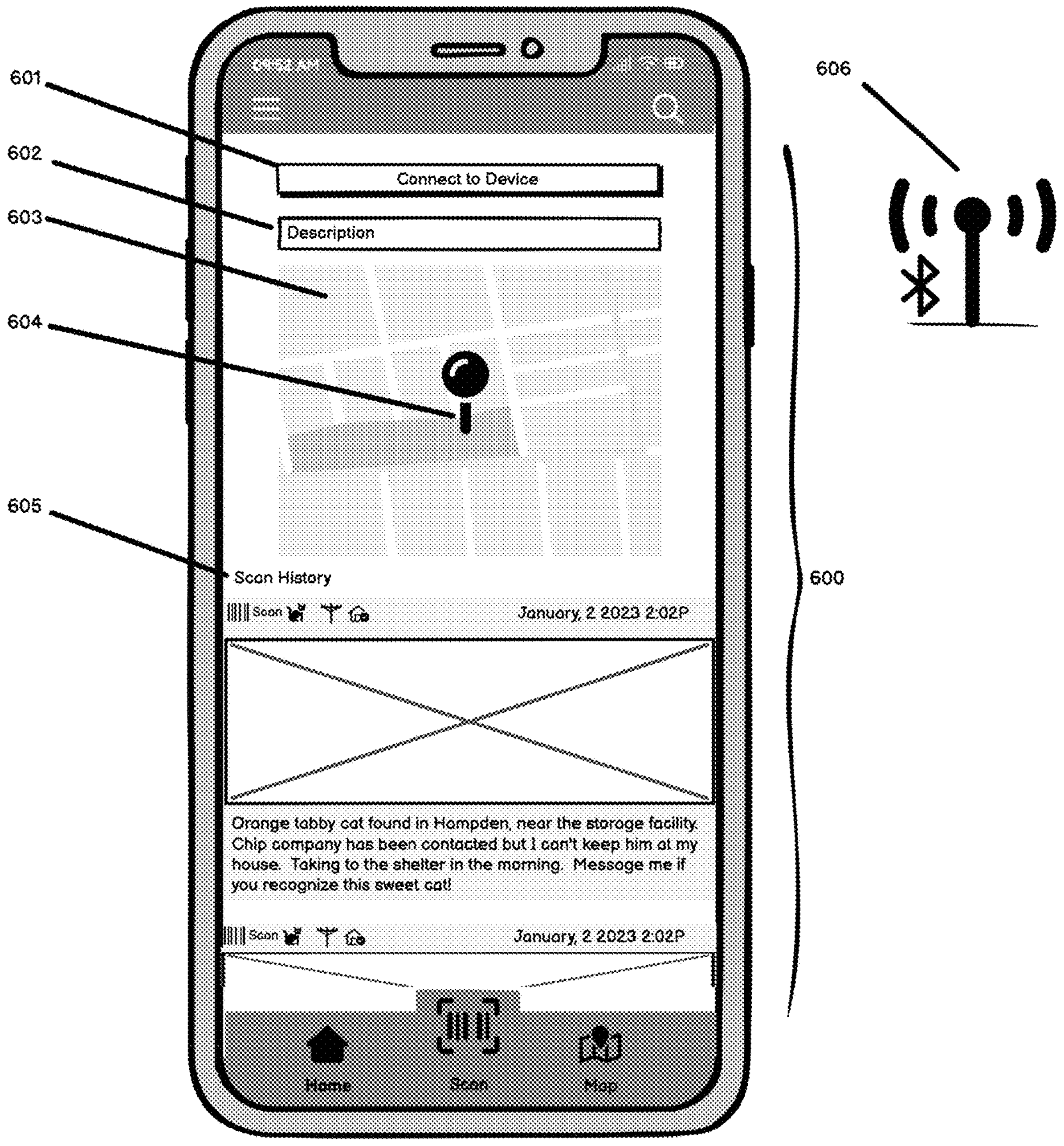
FIG. 6 is an application interface for connecting to a freestanding scanning unit (e.g., a "Totem" device) over Bluetooth.

For the passive scanning scenario with the freestanding unit, FIG. 6 shows an example interface for connecting and managing that setup. In FIG. 6, the mobile application 111 is used to interface with a stationary "Totem" scanner unit. The app may display a list of available freestanding scanners (e.g., detected via Bluetooth or listed via a server if the units are network-connected), and allow the user to select one to connect. The interface could show the status of the chosen unit and provide controls (if needed) to configure or activate it. For instance, a user might use FIG. 6's screen to initiate a remote scan or to put the unit in a certain mode. In one embodiment, once connected, the app simply listens for data—the freestanding unit will automatically send a notification to the server and app when it scans a microchip. FIG. 6 thus provides a way for users to include autonomous scanners in their network and be notified of passive scan events through the same mobile application.

Figure 4:
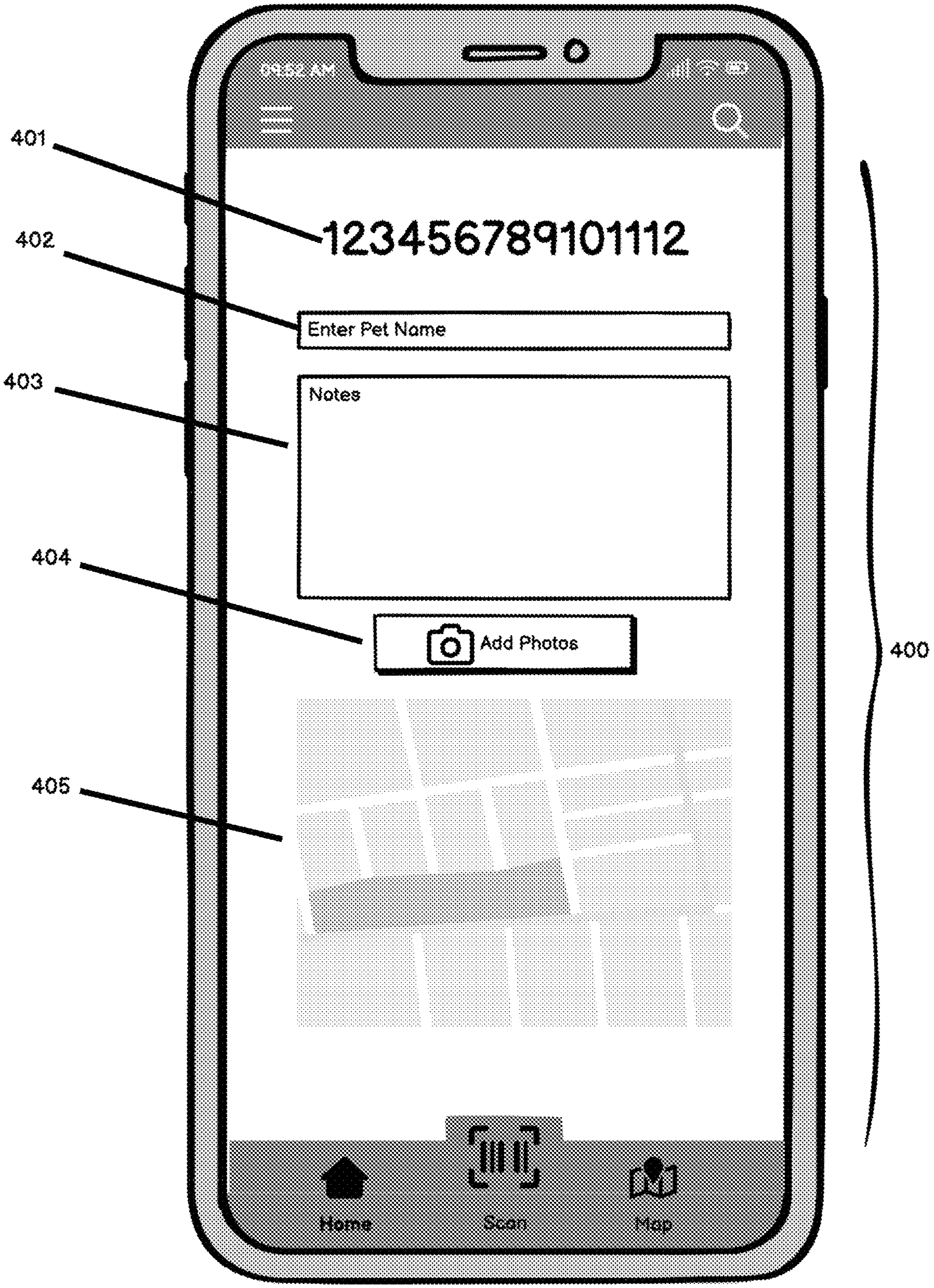
FIG. 4 is a screen displaying scan results after the application reads the animal's microchip.

Post-Scan Data Entry (FIG. 4): After a successful scan (whether active or passive), the system records the microchip ID and relevant context. FIG. 4 illustrates a screen that is displayed on the mobile app once the scanning device 103 has read an animal's microchip ID. In this post-scan interface, the microchip unique identifier 102 is prominently shown (for example, as a read-only label or in a dedicated field) on the screen. The application then allows the user (the finder) to enrich this data before sharing it. As shown in FIG. 4, the user can enter a descriptive label or name for the animal, using a text input field (e.g., field 402, labeled "Pet Name" or similar in the UI). The microchip ID itself may also be displayed as a non-editable field or confirmation (label 401 in the figure). The user is further provided with an opportunity to add additional information: a notes or description field 403 allows input of any relevant details (such as the animal's condition, collar details, etc.), and an image upload interface 404 enables the user to attach one or more photos of the animal. The application automatically captures the location of the scan, and FIG. 4 shows a small map 405 or location indicator on the screen representing where the scan took place. This geolocation is obtained via the smartphone's GPS or from the stationary unit's configured location.

Once the user has optionally added notes and photos, they can save this record, effectively creating a "scan post." The scan post contains the microchip ID (with location and time) and any user-provided metadata like notes or pictures. When the user saves/shares it, the post is transmitted via the network 112 to the backend server 118 (through API 116) and stored in the central repository/database 114. At this point, the scan post becomes visible to other users of the system. For example, pet owners searching for their lost pet could see that a pet with a given microchip was scanned at a certain location.

Lost and Found Posts; Data Management: The platform does not rely solely on scanning. Users can also manually share information about lost or found pets. A pet owner who discovers their pet is missing can create a "lost post" using the application 111. This typically involves entering the pet's details such as name, species/breed, last seen location, and crucially the microchip unique identifier 102 (if known from their vet records or microchip certificate). They may also include their contact information and a reward offer 209, if desired. Similarly, if someone finds an animal but cannot scan it (e.g., they do not have the scanner device handy or the animal evades capture), they can create a "found post". In a found post, the user might input a description of the animal, upload photos, and specify where it was seen or found. They might leave the microchip ID field blank or unknown if not available. Both lost and found posts are also stored in the repository 114 and shared with the user community, much like scan posts.

All posts, once in the database 114, are accessible to users through the app. The application 111 may present a feed of recent posts (lost, found, scan) or allow searching and filtering. As noted earlier, all users with the app have appropriate access to view shared posts, except for any private data which is kept secure. (The database can have secure segments for personal account information 113 linked to each user, which are not exposed publicly).

Matching and Notifications: A significant feature of the system is automatic matching of microchip IDs between posts. The backend server 118 continually or periodically checks for cases where a microchip ID in one post corresponds to the same ID in another post. If a match is found—for instance, a microchip ID 102 recorded in a scan post matches the microchip ID in a lost post—the system will trigger a notification to the relevant users. In this example, the finder who performed the scan, and the pet owner who reported the loss, would both be notified through the application (and optionally via email or SMS through cloud service 117). The notification might alert them that "a potential match has been found between a lost pet and a found pet scan," and it will typically include key details: the time of the scan, the location (often presented as a map pin or address) where the pet was scanned, and information on how to reach out to the other party.

To facilitate a safe and effective communication, the application enables direct messaging between the involved users within the platform. For example, when a match occurs, the owner and finder can open a chat interface in the app or receive contact requests. This approach allows them to discuss and coordinate the pet's return without immediately disclosing personal contact information such as phone numbers or email addresses. (In other words, the app acts as an intermediary; the users can communicate through in-app messages or calls initially.) Only if both parties agree to exchange direct contact details, or once they establish trust (e.g., the owner confirms specific details about the pet or provides proof of ownership), would personal contact info be shared. This privacy-conscious design is supported by the system's workflow—for instance, the microchip ID itself is obfuscated by default in posts visible to others, ensuring that only a hashed or partial representation is shown until a legitimate match is found, at which point the system uses the full ID internally to link records. By matching on an obfuscated value and mediating communication, the platform helps validate each party's connection to the animal while preserving privacy and security for users.

Figure 5:
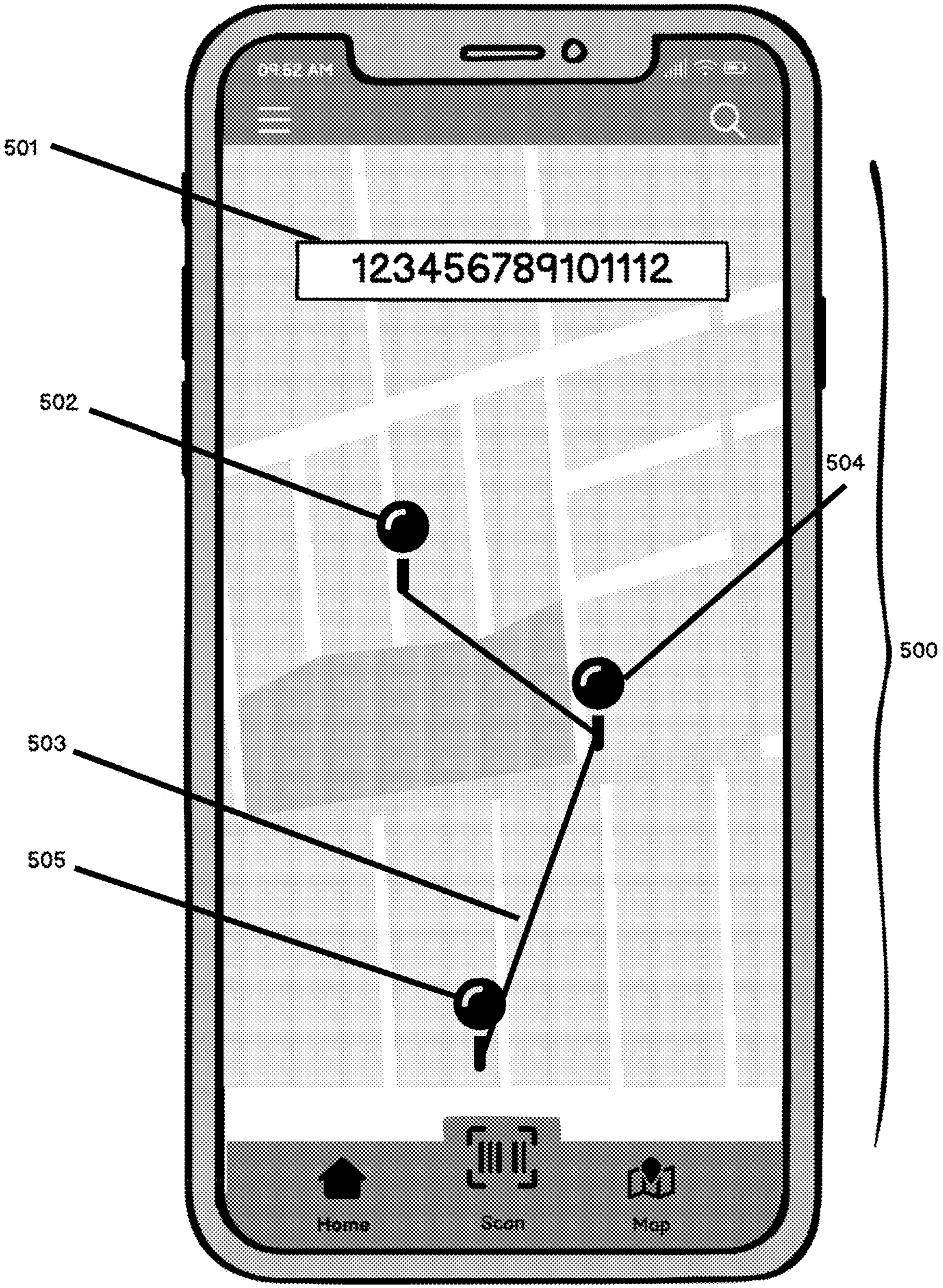
FIG. 5 is a map interface for searching microchip scan events and be-on-the-lookout (BOLO) locations.

Map-Based Search (FIG. 5): In addition to automatic matching, the system provides tools for manual searching and visualization of data. FIG. 5 shows a map interface 500 in the application, which helps users locate scan events or posts geographically. A user can enter a microchip ID (or other search parameters) into an input field 501 on this screen. The application will then filter and display on the map any posts associated with that identifier. For instance, if a pet owner inputs their missing pet's microchip number and that pet was recently scanned by someone, the map 500 will zoom to the location 502 of the most recent scan for that microchip and highlight it (for example, with a pin or marker). The user can tap on the marker to get more information about that scan post (time, finder's notes, etc.). The map view also allows browsing of all nearby posts: by default, it might show all lost, found, or scan posts in the vicinity, giving community members a visual way to see if any unfamiliar animals have been reported in their neighborhood.

Through the combination of these interfaces-list views, scan workflow, and map view—the application 111 enables users to seamlessly contribute data (when they find an animal) and retrieve data (when they lose an animal or want to help) within the same ecosystem. All user interactions (scans, posts, searches) tie back into the central repository 114 and server logic, which coordinate the information flow and matching.

Additional Implementation Details: The detailed description above focuses on a particular embodiment of the invention. It should be understood that various modifications and alternative configurations can be employed without departing from the spirit of the invention. For example, the scanning device 103 could be integrated into other form factors (such as a vehicle-mounted scanner or a drone-based scanner) to extend coverage. The communication between the scanner and the application could utilize different protocols, and the server's matching algorithms could incorporate additional criteria (such as time windows or machine learning image matches of pet photos). The user interface layouts shown in FIGS. 2-6 are exemplary; the actual app could have a different design (for instance, the map and list could be combined, or voice alerts could be used to notify of matches). The invention may also support additional features, like social sharing of posts to external networks or integration with veterinary clinic systems, as optional enhancements.

Throughout this description, references to specific elements (such as scanning device 103, microchip ID 102, etc.) should be understood in the context of the illustrative embodiment of FIG. 1. These references are not intended to restrict the invention to a particular hardware component or numeric designation. Likewise, method steps and user actions described (e.g., tapping a button, adding a photo) are examples of how a typical interaction may occur; equivalent actions (such as voice commands to initiate a scan, or automatic background scanning by the unit) could be substituted.

In sum, the described system provides a comprehensive solution for pet recovery, combining hardware (multi-mode microchip scanners) and software (networked applications and databases) to bridge the gap between lost-and-found social networks and official microchip identification databases. By reading a pet's microchip in the field and instantly linking that data with a cloud platform where pet owners and finders converge, the invention greatly increases the likelihood of timely and successful reunions of lost pets with their owners. All these features and variations are intended to be covered by the following claims, as would be understood by those skilled in the art.

The invention claimed is:

1. A system for animal tracking and recovery, the system comprising:

a plurality of readers configured to wirelessly read implanted radio-frequency identification (RFID) microchips associated with animals, and to store read identifiers of the implanted RFID microchips, wherein the readers are distributed in different geographic locations and are operable during autonomous operation to passively detect and automatically read the implanted RFID microchips as animals move freely within an environment and come within detection range of the system, thereby enabling identification of the animals independent of user initiation;

a plurality of user computing devices configured to receive stored identifiers from the readers, and geographic location identifiers of the geographic locations of the readers, and to communicate the received identifiers, associated scan contextual data automatically generated at the time of reading, and the geographic location identifiers of the geographic locations of the readers, the scan contextual data comprising one or more of a timestamp, a unique scan identifier, a reader identifier, a device name, a device version or other automatically generated scan metadata, wherein the received identifiers, the scan contextual data, and the geographic location identifiers collectively define a scan payload; and a server configured to manage a social media platform, wherein the server is configured to receive the communicated scan payload from the user computing devices, and in response to receipt of the scan payload, manage publication of and user interaction with the scan payload for facilitating tracking and recovery of the animals;

wherein the social media platform is configured to:

post the received scan payload as explicit, user-visible data elements associated with each reading; and manage user interactivities with the posted scan payload for facilitating tracking and recovery of the animals including automatically identifying an animal associated with an implanted RFID microchip by lookup of the identifier, automatically matching the scan payload to previously posted data and initiating user notifications without manual lookup.

2. The system of claim 1, wherein the readers are attachable to freestanding units that are placeable in a selected indoor or outdoor location to passively scan the implanted RFID microchips during autonomous operation, thereby generating the scan payload and automatically recording the scan contextual data.

3. The system of claim 1, wherein each user computing device is configured to enable handheld scanning of the animals such that an individual scans an animal to record at least a portion of the scan payload and initiate the functionality in a software application without affecting the passive, autonomous operation of readers.

4. The system of claim 1, wherein the readers are distributed among a plurality of different geographic locations, each having a corresponding geographic location identifier automatically used by the system in generating the scan payload associated with a reading.

5. A system for animal tracking and recovery, the system comprising:

at least one reader configured to wirelessly read an implanted radio-frequency identification (RFID) microchip associated with an animal, and to store a read identifier of the implanted RFID microchip and a geographic location identifier of a geographic location of the reader during autonomous operation as animals move freely within an environment and come within detection range of the system; and a first computing device comprising:

a communications module configured to receive the stored identifier and the geographic location identifier;

an application configured to:

manage communication of the stored identifier, associated scan contextual data automatically generated at the time of reading and comprising one or more of a timestamp, a unique scan identifier, a reader identifier, a device name, a device version, or other automatically generated scan metadata, and the geographic location identifier of the geographic location of the reader to a social media platform, wherein the stored identifier, the scan contextual data, and the geographic location identifier collectively define a scan payload;

determine an identity of the animal associated with the implanted RFID microchip by lookup of the stored identifier, and to use the geographic location identifier to determine where the animal has been observed;

manage, via a user interface, user interaction with the social media platform, wherein the user interaction includes:

(a) load of the scan payload;

(b) presentation of others' publications of scan payloads associated with implanted RFID microchips associated with animals;

(c) contribute additional contextual data to the others' posts.

6. The system of claim 5, wherein the application is configured to store the received scan payload in memory of the first computing device in response to receipt of the scan payload as part of an automated tracking and recovery workflow.

7. The system of claim 5, wherein the social media platform is configured to communicate at least a portion of the scan payload to others in response to receipt of the scan payload to facilitate automated matching and notification and without requiring manual user initiation.

* * * * *